(12) United States Patent
Knapp

(10) Patent No.: US 11,235,500 B2
(45) Date of Patent: Feb. 1, 2022

(54) SYSTEM AND METHOD FOR MOLDING RFID TAGS

(71) Applicant: Y-Tex Corporation, Cody, WY (US)

(72) Inventor: Ronald K. Knapp, Cody, WY (US)

(73) Assignee: Y-Tex Corporation, Cody, WY (US)

( * ) Notice: Subject to any disclaimer, the term of this patent is extended or adjusted under 35 U.S.C. 154(b) by 435 days.

(21) Appl. No.: 16/054,341

(22) Filed: Aug. 3, 2018

(65) Prior Publication Data

US 2020/0039128 A1    Feb. 6, 2020

(51) Int. Cl.
*B29C 45/14*     (2006.01)
*A01K 11/00*     (2006.01)
*B29C 45/16*     (2006.01)

(52) U.S. Cl.
CPC ...... *B29C 45/14811* (2013.01); *A01K 11/004* (2013.01); *B29C 45/14073* (2013.01); *B29C 45/162* (2013.01); *B29C 45/1671* (2013.01); *B29C 2045/1409* (2013.01); *B29C 2045/14147* (2013.01); *B29C 2045/14852* (2013.01)

(58) Field of Classification Search
None
See application file for complete search history.

(56) References Cited

U.S. PATENT DOCUMENTS

| | | | |
|---|---|---|---|
| 3,363,040 A * | 1/1968 | Aoki | B29C 45/14688 264/278 |
| 6,501,430 B1 | 12/2002 | Esselink | |
| 7,854,079 B2 | 12/2010 | Hilpert | |
| 8,099,884 B2 | 1/2012 | van Wijk et al. | |
| 9,005,505 B2 | 4/2015 | van Wijk et al. | |
| 9,038,293 B2 | 5/2015 | Decaluwe et al. | |
| 9,626,536 B2 | 4/2017 | Bladen et al. | |
| 10,021,857 B2 | 7/2018 | Bailey et al. | |
| 2003/0076662 A1 * | 4/2003 | Miehling | G06K 19/07724 361/760 |
| 2008/0047177 A1 | 2/2008 | Hilpert | |
| 2008/0150701 A1 | 6/2008 | Randmae | |
| 2009/0250836 A1 * | 10/2009 | Fukui | B29C 43/36 264/272.15 |
| 2010/0259393 A1 | 10/2010 | Marur et al. | |
| 2012/0248199 A1 * | 10/2012 | Schimmel | H01L 21/565 235/492 |
| 2015/0068077 A1 | 3/2015 | Robadey | |
| 2017/0001351 A1 * | 1/2017 | Nakamura | B29C 45/1615 |

OTHER PUBLICATIONS

International Search Report and Written Opinion dated Nov. 18, 2019 corresponding to PCT/US2019/043837, 11 pages.

* cited by examiner

*Primary Examiner* — Marc C Howell
*Assistant Examiner* — John J DeRusso
(74) *Attorney, Agent, or Firm* — Harness, Dickey & Pierce, P.L.C.

(57) ABSTRACT

An example method for making a radio frequency identification (RFID) tag according to the present disclosure includes holding a transponder within a cavity of a mold using a fixture, closing the mold, injecting material into the mold cavity and around the transponder to form a part of the RFID tag, opening the mold, and ejecting the part from the mold.

26 Claims, 9 Drawing Sheets

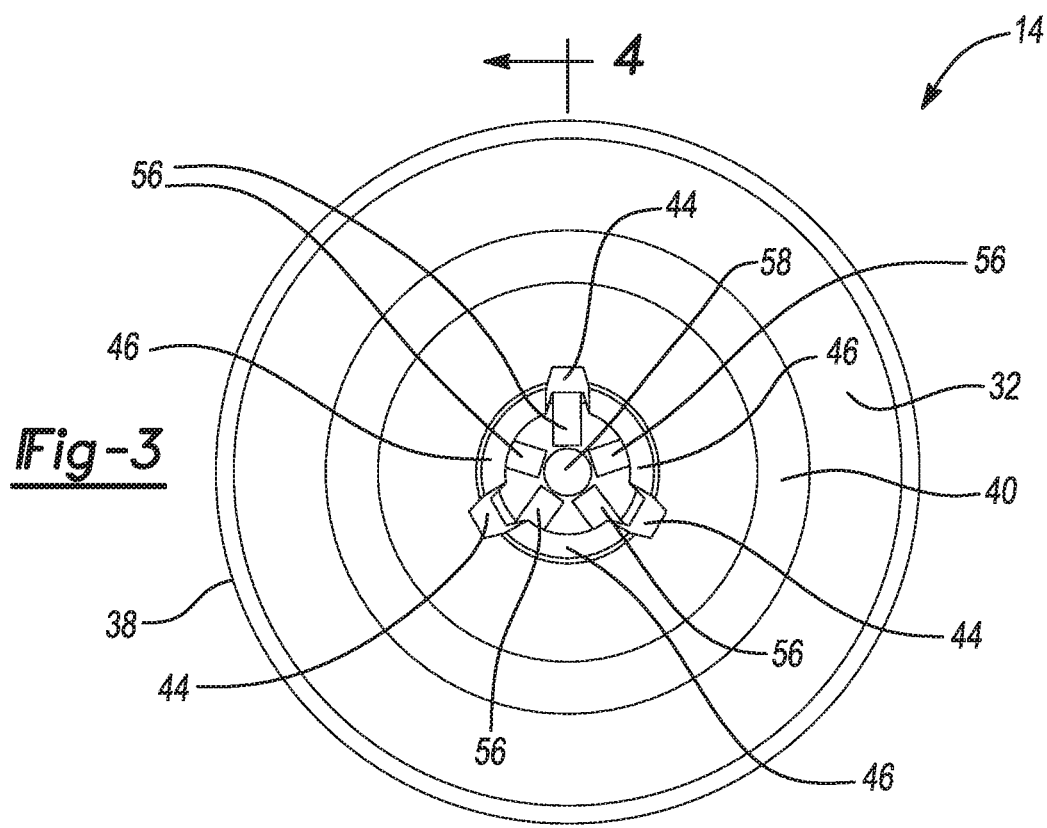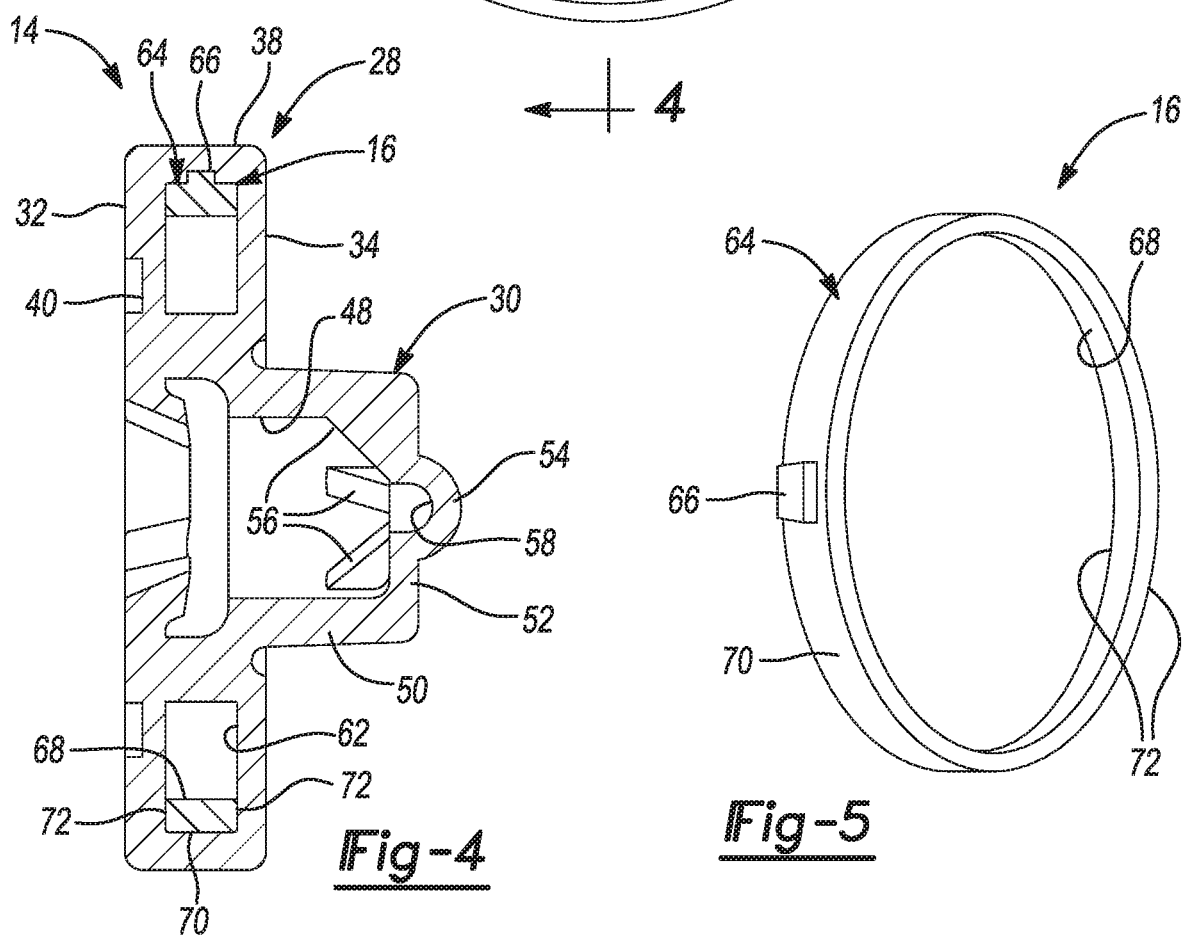

SYSTEM AND METHOD FOR MOLDING RFID TAGS

FIELD

The present disclosure relates to systems and methods for molding RFID tags.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Radio frequency identification (RFID) systems include an RFID tag attached to an object and an RFID reader that identifies and tracks the object by sending a signal to the RFID tag and reading its response. RFID tags are used in many industries to identify and track objects to which the RFID tags are attached. For example, RFID tags are attached to automobiles to track their progress through an assembly line, RFID tags are attached to pharmaceuticals to track their progress through warehouses, and RFID tags are attached to livestock for identification thereof.

RFID tags used to track livestock are typically attached to an ear of an animal. An ear RFID tag typically includes a male part and a female part that are joined together through the animal's ear to secure the ear RFID tag to the animal. The female part typically includes a plastic housing enclosing a transponder that communicates with RFID readers that are positioned within the vicinity of livestock.

SUMMARY

An example method for making a radio frequency identification (RFID) tag according to the present disclosure includes holding a transponder within a cavity of a mold using a fixture, closing the mold, injecting material into the mold cavity and around the transponder to form a part of the RFID tag, opening the mold, and ejecting the part from the mold.

In one example, the fixture includes a pair of ring pins.

In one example, the method further includes positioning the ring pins in the mold cavity, and closing the mold to hold the transponder between the ring pins.

In one example, the method further includes placing the transponder on a ledge of one of the ring pins before closing the mold.

In one example, the transponder includes an antenna and an integrated circuit (IC) chip, and an inner radial surface of the antenna contacts the ledge of the one ring pin when the transponder is placed on the ledge.

In one example, the method further includes attaching the IC chip to an outer radial surface of the antenna before placing the transponder on the ledge.

In one example, the method further includes moving the ring pins away from one another to allow the material to flow between the transponder and the ring pins.

In one example, the method further includes measuring a position of an injector that injects the material into the mold cavity, and determining when to move the ring pins away from one another based on the injector position.

In one example, the method further includes determining when to move the ring pins away from one another based on a duration of a period for which the material is injected into the mold cavity.

In one example, the method further includes determining when to move the ring pins away from one another based on a pressure within the mold cavity.

An example system for making an RFID tag according to the present disclosure includes a mold having a cavity, a fixture configured to hold a transponder within the mold cavity, and an injector configured to inject material into the mold cavity and around the transponder to form a part of the RFID tag.

In one example, the fixture includes a pair of ring pins.

In one example, the system further includes an actuator configured to move the ring pins toward and away from one another within the mold cavity, and an actuator control module configured to control the actuator to move the ring pins toward one another to hold the transponder between the ring pins.

In one example, at least one of the ring pins has a ledge for holding the transponder.

In one example, the transponder includes an antenna and an IC chip, and an inner radial surface of the antenna contacts the ledge of the one ring pin when the transponder is placed on the ledge.

In one example, the IC chip is attached to an outer radial surface of the antenna.

In one example, the actuator control module is configured to control the actuator to move the ring pins away from one another to allow the material to flow between the transponder and the ring pins.

In one example, the system further includes a position sensor configured to measure a position of the injector, wherein the actuator control module is configured to determine when to control the actuator to move the ring pins away from one another based on the injector position.

In one example, the actuator control module is configured to determine when to control the actuator to move the ring pins away from one another based on a duration of a period for which the material is injected into the mold cavity.

In one example, the actuator control module is configured to determine when to control the actuator to move the ring pins away from one another based on a pressure within the mold cavity.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a front view of a female part of the RFID tag of FIGS. 1 and 2;

FIG. 4 is a section view of the female part of the RFID tag of FIGS. 1 and 2 taken along a line 4-4 shown in FIG. 3;

FIG. 5 is a perspective view of a transponder in the RFID tag of FIGS. 1 and 2;

In the drawings, reference numbers may be reused to identify similar and/or identical elements.

DETAILED DESCRIPTION

The process for manufacturing the female part of an ear RFID tag typically involves at least four steps. The first step involves molding the two halves of the plastic housing that encloses the transponder. The second step involves manually placing the transponder in a cavity formed in one of the two halves. The third step involves potting the transponder in place in the cavity using, for example, epoxy. The fourth step involves welding the two halves together.

In contrast, a system and method for making an RFID tag according the present disclosure forms a completed female part of an ear RFID tag in a single molding step. In one example, a pair of fixtures (e.g., ring pins) are placed in a cavity of a mold, the transponder is placed on an annular ledge of one of the fixtures, and the mold is closed to clamp the transponder between the fixtures. Then, material is injected into the mold cavity and around the transponder to form the plastic housing that encloses the transponder.

By forming a completed female part of an ear RFID tag in a single molding step, the system and method reduces the number of operations required to make the female part, as well as the associated costs. However, forming a completed female part in a single molding step required overcoming certain technical challenges. For example, it is difficult to ensure that the transponder is not damaged or oriented improperly when the plastic housing of the female part is molded around the transponder.

A system and method according to the present disclosure overcomes this challenge through the design and manner of using the fixtures that hold the transponder when the plastic housing of the female part is molded around the transponder. In addition, the system and method enables the design of the fixtures in part by changing the location of an integrated circuit (IC) chip of the transponder on an antenna of the transponder. Normally, the antenna has a ring shape, and the IC chip is located on an inner radial surface of the antenna or a side face of the antenna. In contrast, a system and method according to the present disclosure relocates the IC chip to an outer radial surface of the antenna so that the transponder can be positioned on the annular ledge of the fixture in any orientation, and the IC chip will not interfere with closing the mold.

The discussion that follows focuses on how the system and method according to the present disclosure can be used to make an ear RFID tag. However, it should be understood that the teachings of the present disclosure apply to other types of RFID tags. To this end, most RFID tags include a transponder encased within a plastic housing. Thus, the system and method according to the present disclosure can be employed to reduce the number of operations and cost associated with making most types of RFID tags.

Figure 1:
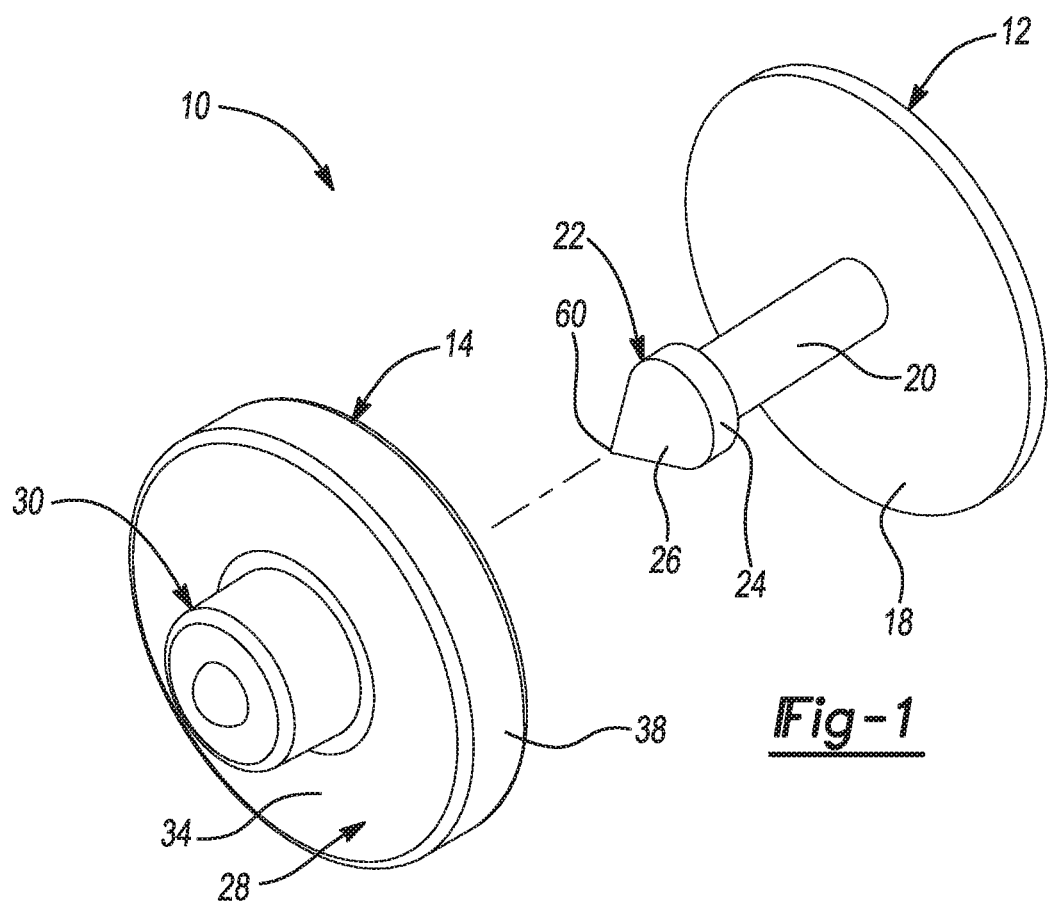
FIGS. 1 and 2 are perspective views of a RFID tag according to the present disclosure.
Figure 2:
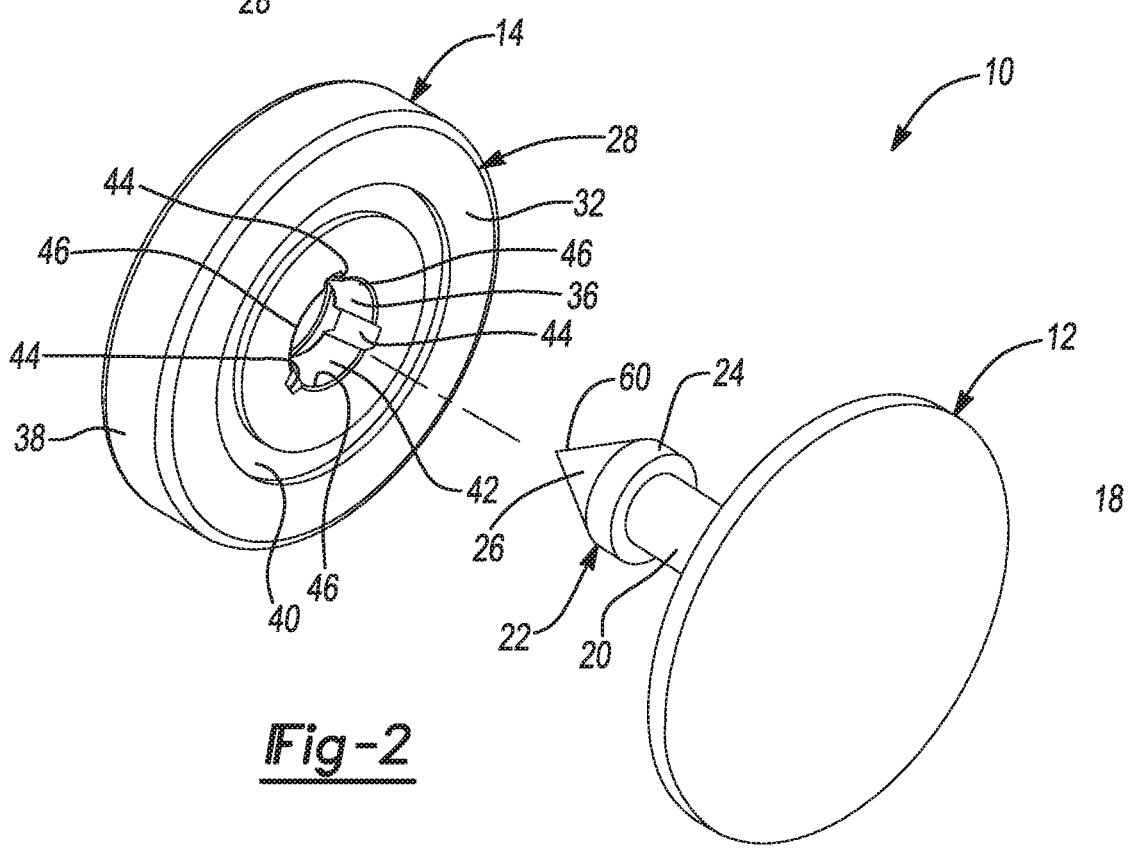
Figure 8:
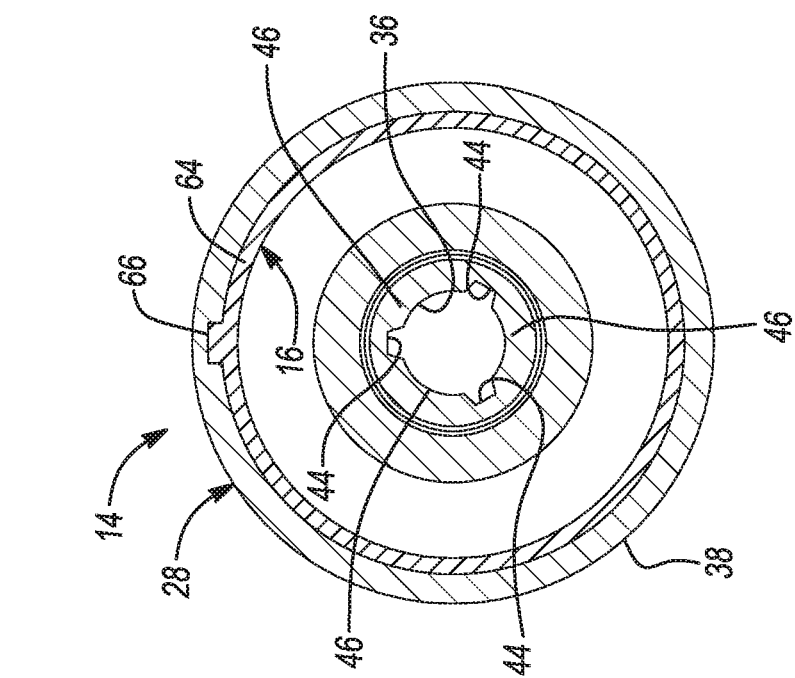
FIG. 8 is a section view of the female part of the RFID tag of FIGS. 1 and 2 taken along a line 8-8 shown in FIG. 6.
Figure 7:
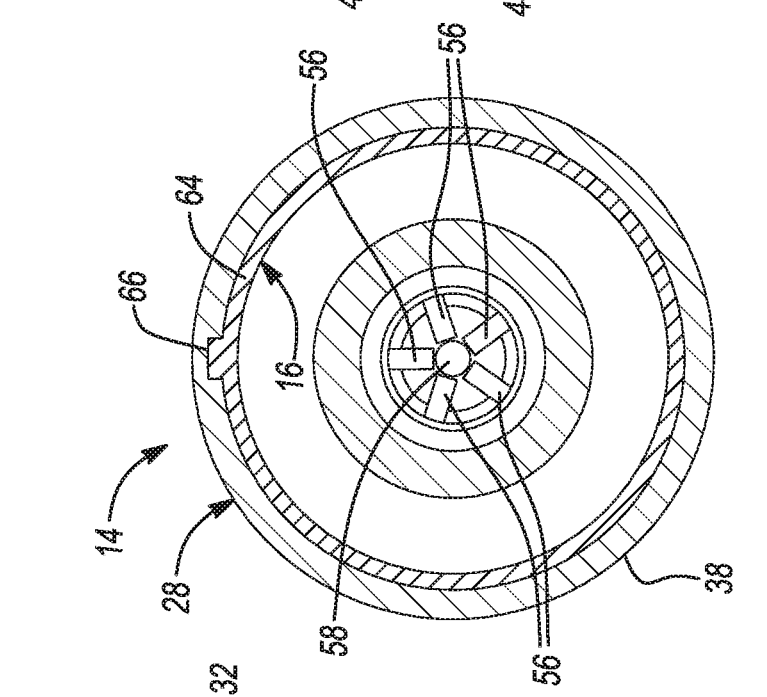
FIG. 7 is a section view of the female part of the RFID tag of FIGS. 1 and 2 taken along a line 7-7 shown in FIG. 6.
Figure 6:
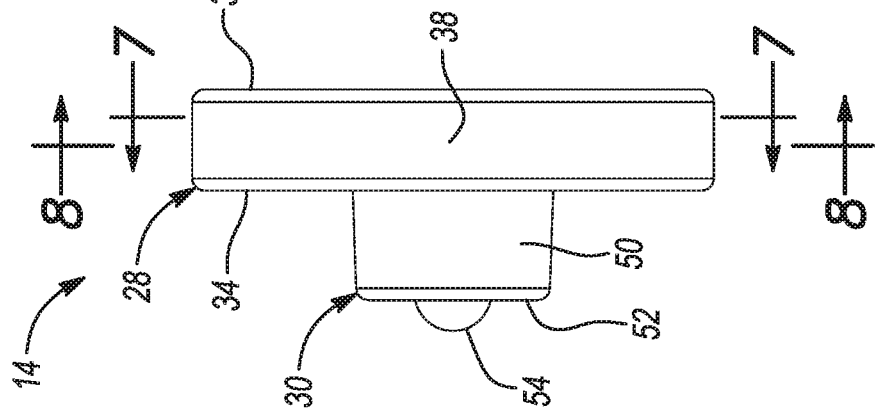
FIG. 6 is a side view of the female part of the RFID tag of FIGS. 1 and 2.

Referring now to FIGS. 1 and 2, an RFID tag 10 includes a male part 12 and a female part 14. The female part 14 is an example of an RFID tag part that may be made using a system and method according to the present disclosure. The RFID tag 10 is configured to be secured to the ear of an animal by joining male and female parts 12 and 14 to one another through the animal's ear. The female part 14 includes a transponder 16 (FIG. 4) that communicates with an RFID reader (not shown) to record information about the animal such identification, location, and/or feeding patterns.

The male part 12 includes a base 18, a shaft 20 extending from the base 18, and a head 22 disposed at one end of the shaft 20. As illustrated in FIGS. 1 and 2, the base 18 may be disk shaped, the shaft 20 may be cylindrical, and the head 22 may include a cylindrical portion 24 and a conical portion 26. The base 18, the shaft 20, and the head 22 may be formed from plastic.

In addition to the transponder 16, the female part 14 includes a base 28 and a cap 30 projecting from the base 28. As illustrated in FIGS. 1 and 2, the base 28 and the cap 30 may both be cylindrical, and the diameter of the base 28 may be greater than the diameter of the cap 30. The base 28 and the cap 30 may be formed from plastic.

The base 28 has a front axial end surface 32, a back axial end surface 34, an inner radial surface 36, and an outer radial surface 38. A circular groove 40 is formed in the front axial end surface 32 of the base 28 as a result of the system and method according to the present disclosure, as discussed in more detail below. The cap 30 projects from the back axial end surface 34 of the base 28. The inner radial surface 36 defines an opening 42 configured to receive the shaft 20 and the head 22 of the male part 12. In addition, the inner radial surface 36 defines a plurality of linear grooves 44 circumferentially spaced apart from one another and separating jaws 46 from one another to allow the jaws 46 to flex as the head 22 is inserted through the opening 42.

With additional reference to FIGS. 3-8, the base 28 and the cap 30 collectively define a male part receptacle 48 that holds the head 22 of the male part 12 and a portion of the shaft 20 of the male part 12. To secure the RFID tag 10 to an ear of an animal, the head 22 of the male part 12 is inserted through the animal's ear, through the opening 42 in the female part 14, and into the male part receptacle 48 of the female part 14. As the head 22 of the male part 12 is inserted through the opening 42 in the female part 14, the jaws 46 of the female part 14 flex radially outward to allow the head 22 to be inserted through the opening 42. Once the head 22 is inserted past the jaws 46, the jaws 46 return to their original position to retain the head 22 of the male part 12 within the male part receptacle 48 of the female part 14. In this regard, the male and female parts 12 and 14 are joined together via a snap fit.

As best shown in FIG. 4, the cap 30 includes a tubular portion 50, a disk-shaped portion 52, a dome-shaped portion 54, and a plurality of triangular braces 56 extending between the tubular portion 50 and the disk-shaped portion 52 and circumferentially spaced apart from one another. The triangular braces 56 act as a stop for the head 22 of the male part 12 as the head 22 is inserted into the male part receptacle 48 of the female part 14. The braces 56 are shaped to conform to the conical portion 26 of the head 22 so that the head 22 is held tightly within the male part receptacle 48. The dome-shaped portion 54 of the cap 30 defines a dimple 58 that receives a pointed tip 60 of the head 22 when the head 22 contacts the braces 56.

In addition to defining the male part receptacle 48, the base 28 of the female part 14 defines a transponder receptacle 62 that holds the transponder 16. The transponder 16 includes an antenna 64 and an integrated circuit (IC) chip 66. The antenna 64 has an inner radial surface 68, an outer radial surface 70, and opposing side surfaces 72. The IC chip 66 is attached to the outer radial surface 70 of the antenna 64. As best shown in FIG. 5, the antenna 64 may be ring shaped and the IC chip 66 may have a rectangular cuboid shape. In addition, the shape of the transponder receptacle 62 in the base 28 may conform to the shapes of the antenna 64 and the IC chip 66.

Figure 9:
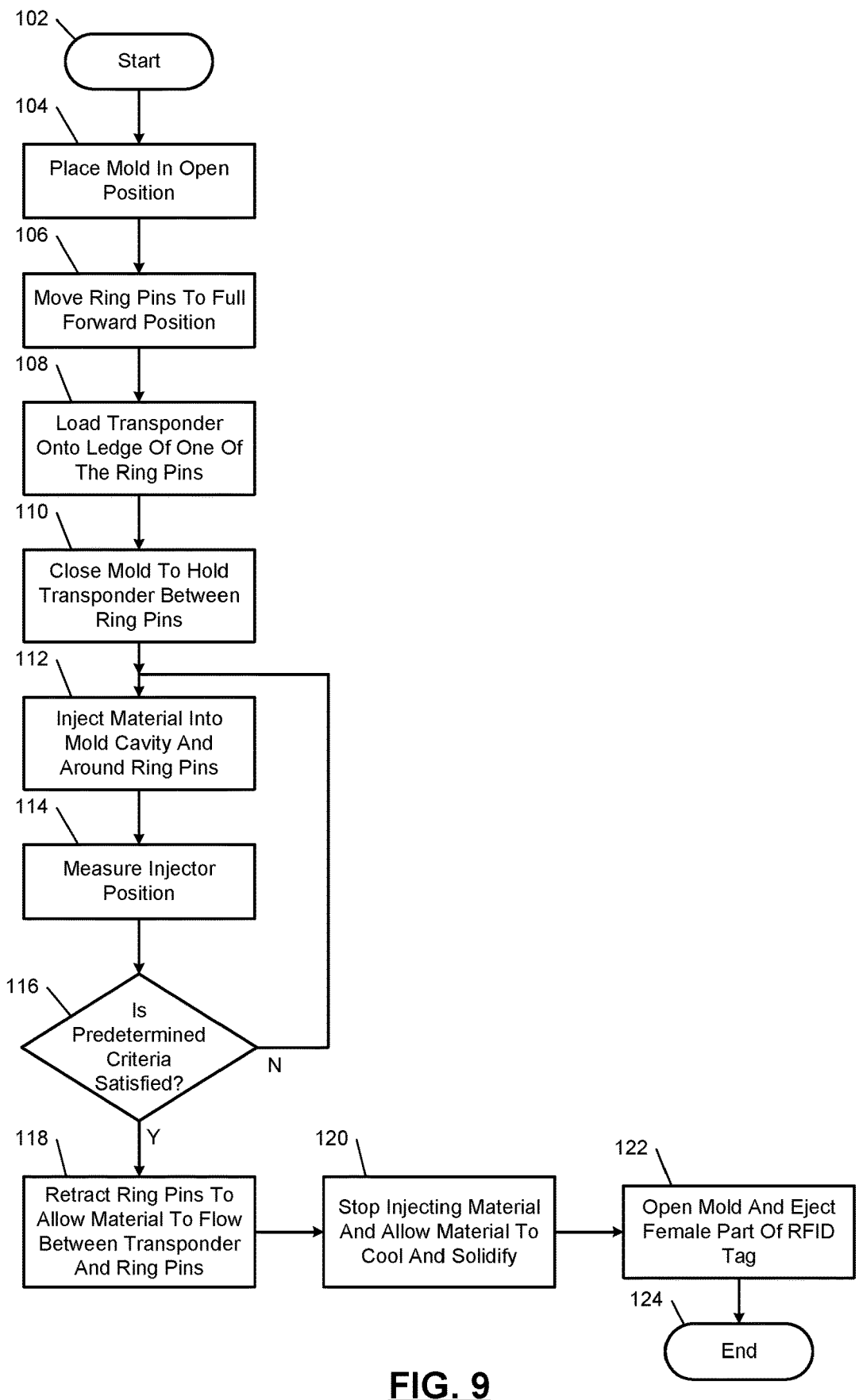
FIG. 9 is a flowchart illustrating a method for making an RFID tag according to the present disclosure.
Figure 10:
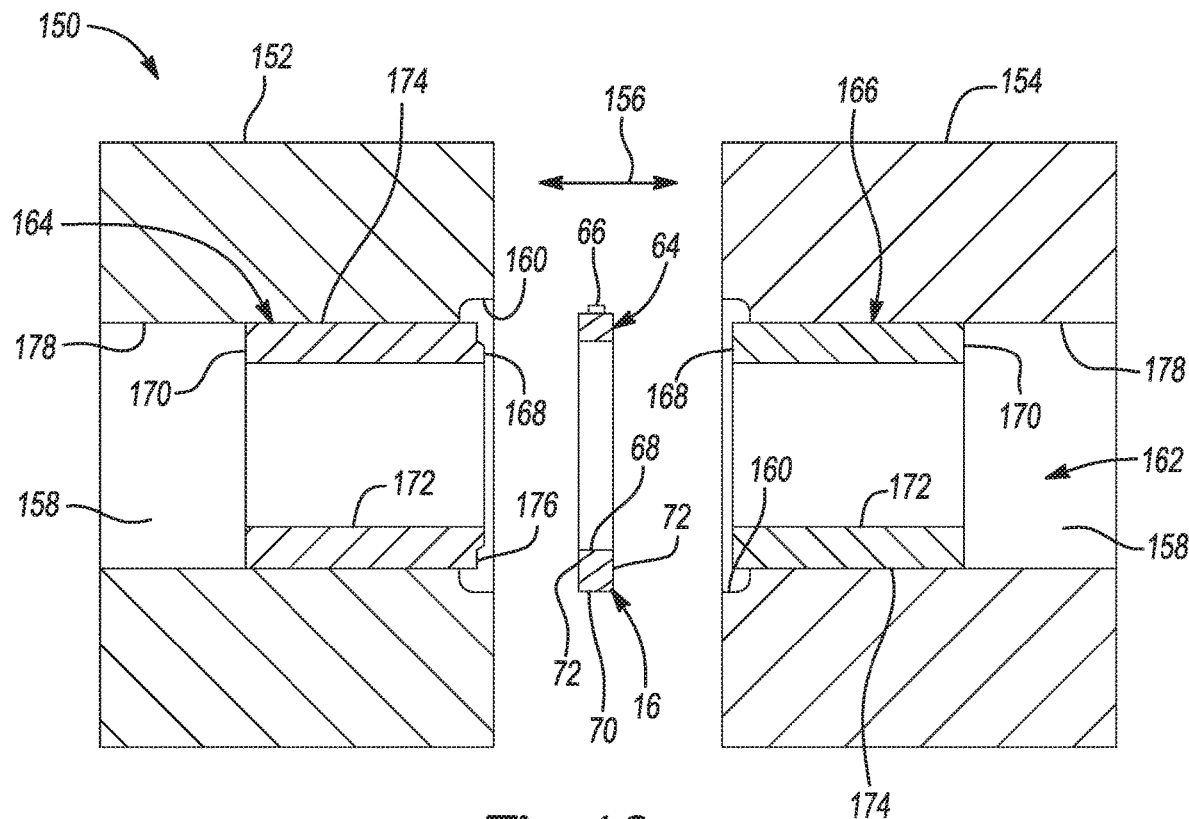
FIG. 10 is a section view of a pair of ring pins disposed in a mold with a transponder disposed between the ring pins.

Referring now to FIG. 9, a method for molding the female part 14 of the RFID tag 12 begins at step 102. At step 104, a mold 150 is placed in an open position as shown in FIG. 10. More specifically, a first half 152 of the mold 150 and a second half 154 of the mold 150 are moved away from one another in an axial direction 156. Each of the first and second halves 152 and 154 of the mold 150 has a through bore 158 and a counter bore 160 that collectively form an internal cavity 162 of the mold 150.

Figure 11:
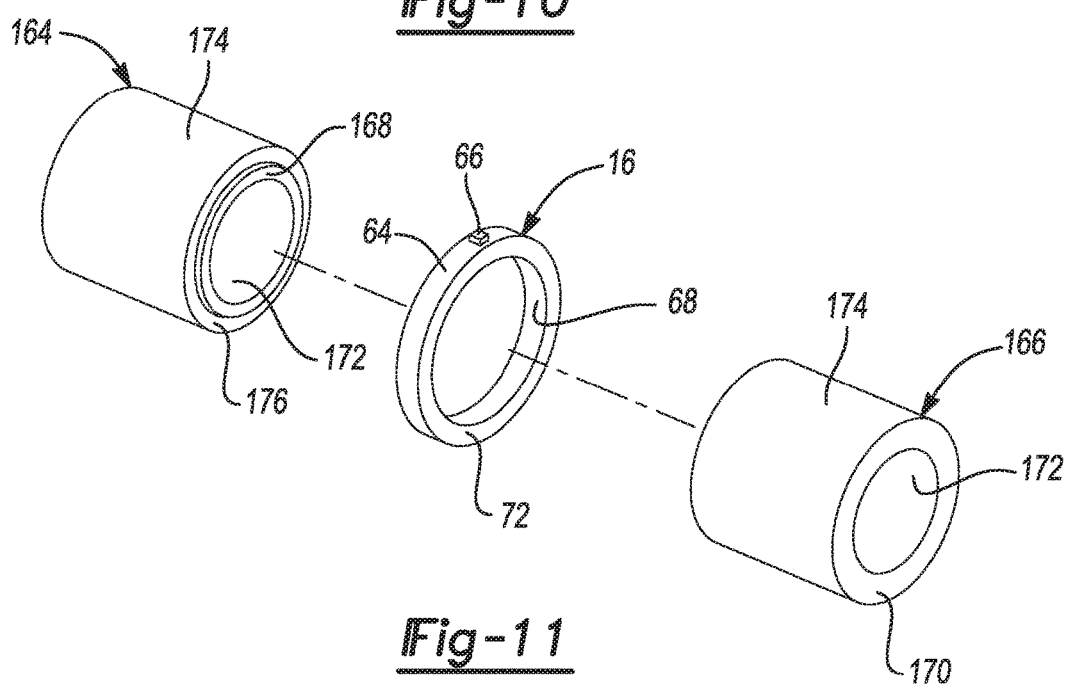
FIG. 11 is a perspective view of transponder positioned between the ring pins.

At step 106, first and second ring pins 164 and 166 are moved toward one another in the axial direction 156 to a full forward position in the mold cavity 162 as shown in FIG. 10. Each of the first and second ring pins 164 and 166 has a tubular shape with a front axial end surface 168, a rear axial end surface 170, an inner radial surface 172, and an outer radial surface 174. In addition, the front axial end surface 168 of the first ring pin 164 defines a ledge 176, which may have an annular shape. The outer radial surfaces 174 of the first and second ring pins 164 and 166 may contact inner radial surfaces 178 of the mold 150 when the ring pins 164, 166 are in the mold cavity 162. When the first and second ring pins 164 and 166 are moved to their respective full forward positions, the ring pins 164, 166 are moved in the axial direction 156 relative to the first and second halves 152 and 154 of the mold 150, respectively. With the first and second ring pins 164 and 166 in their respective full forward positions, the transponder 16 may be positioned between the ring pins 164, 166 as shown in FIGS. 10 and 11.

Figure 15A:
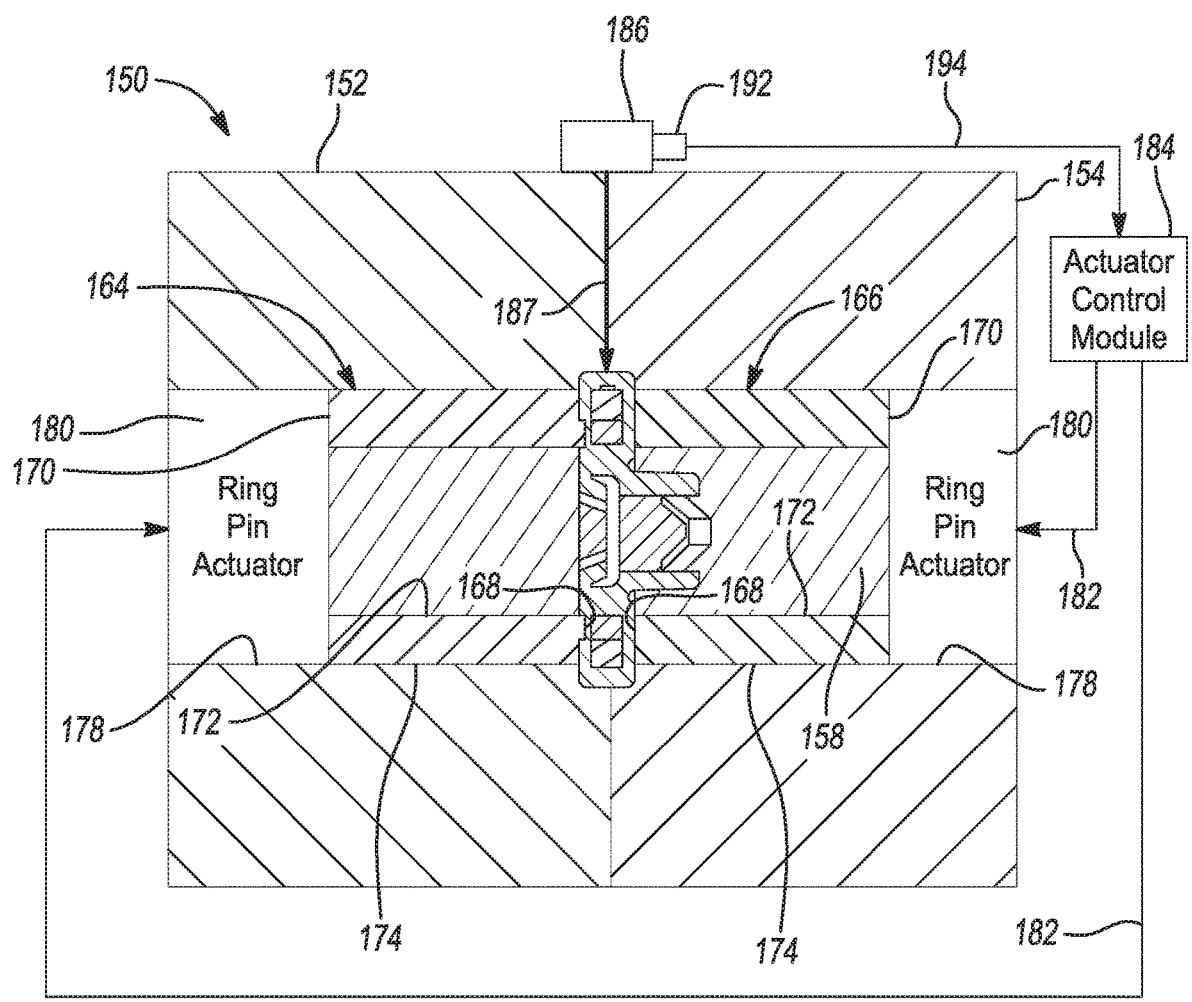
FIGS. 15A and 15B are section views similar to those of FIGS. 14A and 14B except that the ring pins are moved apart from one another to allow material to flow between the ring pins and the transponder to form the remainder of the female part of the RFID tag of FIGS. 1 and 2.

The first and second ring pins 164 and 166 may be moved toward or away from one another in the axial direction 156 by hand (i.e., manually). Alternatively, the first and second ring pins 164 and 166 may be moved toward or away from one another in the axial direction 156 using ring pin actuators 180 (FIG. 15A). Each ring pin actuator 180 may be a hydraulic cylinder or actuator, a pneumatic actuator, an electric actuator, or a combination thereof. Each ring pin actuator 180 may actuate in response to an actuator control signal 182 generated by an actuator control module 184.

Figure 12:
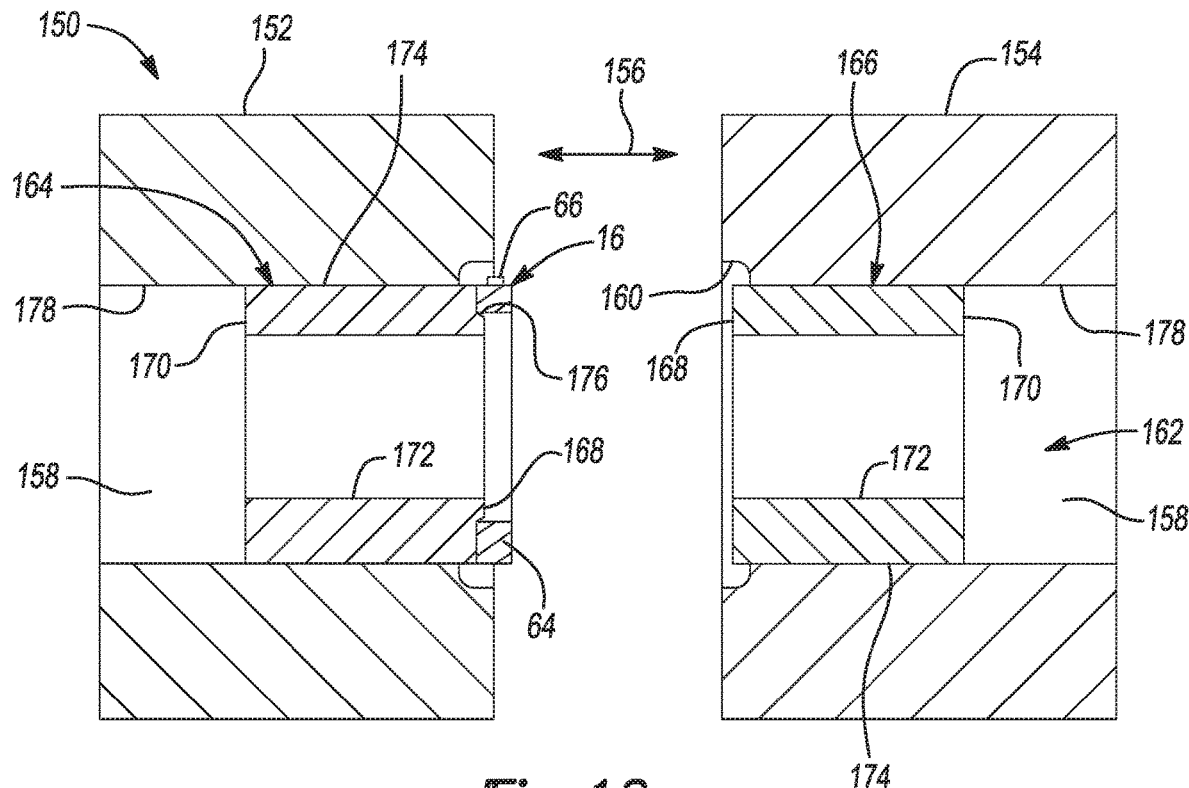
FIG. 12 is a section view of the ring pins disposed in the mold and the transponder positioned on a ledge of one of the ring pins.

At step 108, the transponder 16 is loaded (i.e., placed) onto the ledge 176 of the first ring pin 164 as shown in FIG. 12. The ledge 176 positions the transponder 16 at a desired location and orientation in the mold 150 and servers to temporarily hold the transponder 16 until the mold 150 is closed. When the transponder 16 is loaded onto the ledge 176, the inner radial surface 68 of the antenna 64 contacts the ledge 176. Since the IC chip 66 is attached to the outer radial surface 70 rather than the inner radial surface 68 or one of the side surfaces 72, the transponder 16 may be placed on the ledge 176 in any orientation, and the IC chip 66 will not interfere with closing the mold 150.

Figure 13:
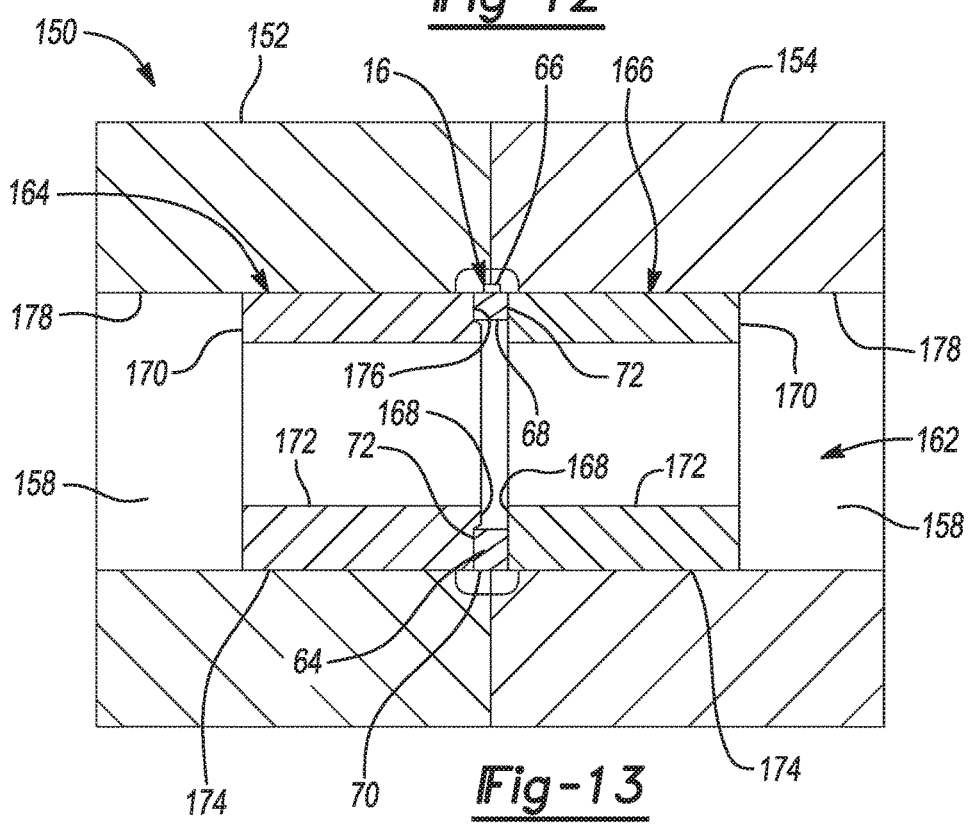
FIG. 13 is a section view of the ring pins disposed in the mold with the mold in a closed position so that the transponder is held between the ring pins.

At step 110, the mold 150 is moved to a closed position to hold the transponder 16 between the first and second ring pins 164 and 166 as shown in FIG. 13. More specifically, when the mold 150 is in the closed position and the first and second ring pins 164 and 166 are in their respective full forward positions, the front axial end surfaces 168 of both ring pins 164, 166 contact the side surfaces 72 of the transponder 16. In turn, the transponder 16 is clamped between the first and second ring pins 164 and 166 during the injection process.

The mold 150 may be moved between the open and closed positions by hand (i.e., manually). Alternatively, the mold 150 may be moved between the open and closed positions using a mold actuator (not shown). The mold actuator may be a hydraulic actuator, a pneumatic actuator, an electric actuator, or a combination thereof. The mold actuator may be controlled by a mold actuator control module (not shown).

Figure 14A:
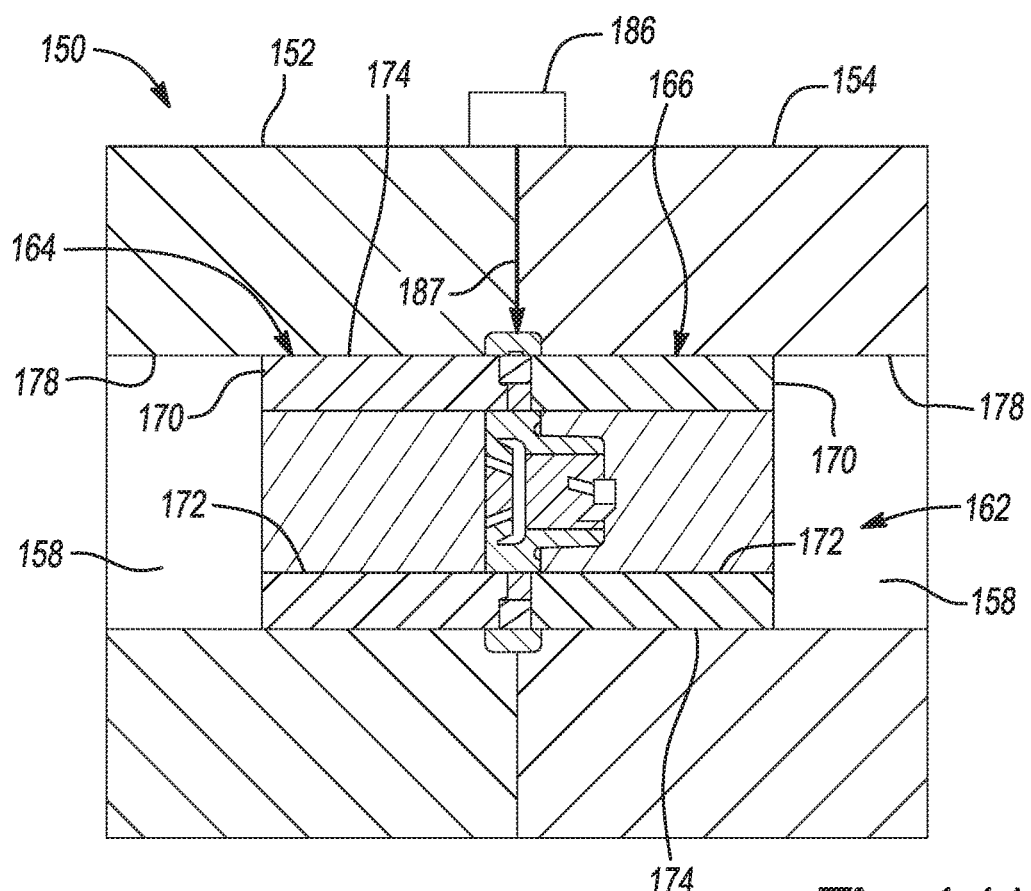
FIGS. 14A and 14B are section views similar to that of FIG. 13 with material injected into the mold to form a portion of the female part of the RFID tag of FIGS. 1 and 2.
Figure 14B:
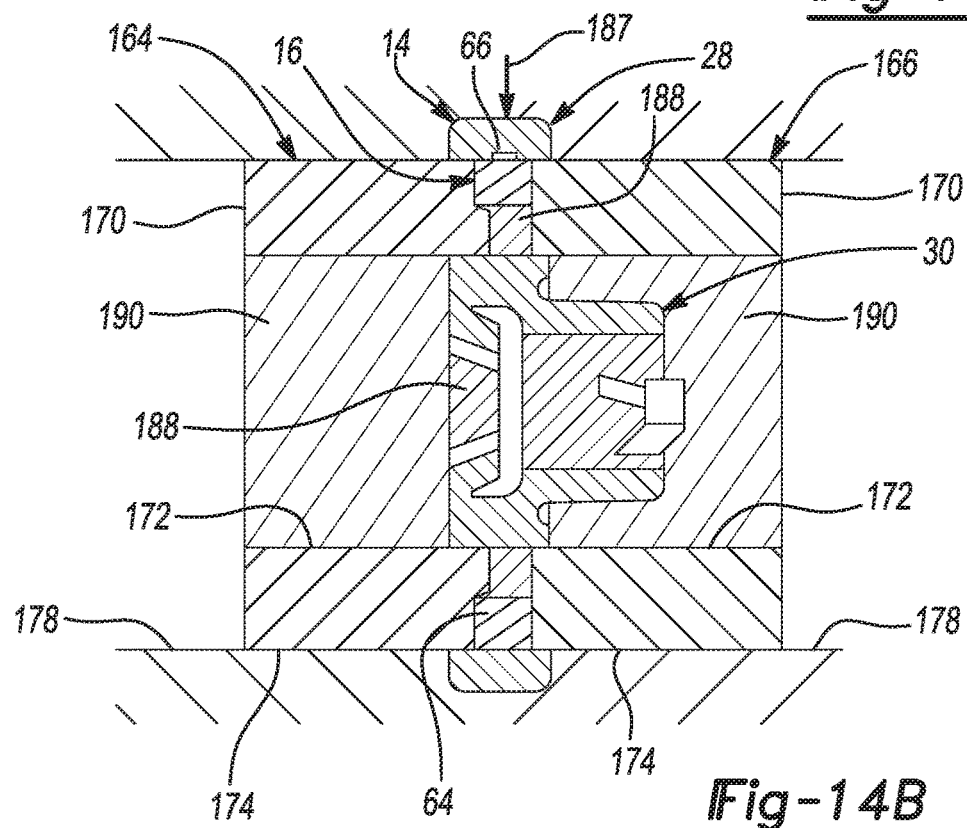

At step 112, an injector 186 injects material (e.g., heated plastic material) through a delivery channel 187 in the mold 150, into the mold cavity 162, and around the first and second ring pins 164 and 166 as shown in FIGS. 14A and 14B. During this initial injection step, the first and second ring pins 164 and 166 remain in contact with the transponder 16 to ensure that the transponder 16 is not damaged or oriented improperly. Before material is injected into the mold cavity 162, one or more core pins 188 may be positioned within the hollow interior of the first and second ring pins 164 and 166 to form the receptacles 48, 62 of the female part 14. In addition, a pair of core pins 190 may be used to position the core pins 188 within the mold cavity 162, to form the front and back axial end surfaces 32 and 34 of the base 28 of the female part 14, and to form the outer surfaces of the cap 30 of the female part 14.

At step 114, an injector position sensor 192 measures a position of the injector 186. For example, the injector position sensor 192 may measure the position of a screw head in the injector 186 that forces material into the mold cavity 162. The injector position sensor 188 generates an injector position signal 194 indicating the injector position.

At step 116, the actuator control module 184 determines whether predetermined criteria for retracting the first and second ring pins 164 and 166 is satisfied. For example, the actuator control module 184 may determine whether the injector position from the injector position sensor 192 is greater than a predetermined position. The injector position may be expressed as a percentage, where zero percent indicates that no material has been injected and 100 percent indicates that all of the material in the injector 186 has been injected. In this example, the actuator control module 184 may determine that the predetermined criteria is satisfied when the injector position is greater than the predetermined position.

In another example, a pressure sensor may be located within the mold cavity 162, and the actuator control module 184 may determine that the predetermined criteria is satisfied when the mold cavity pressure is greater than a predetermined pressure. In another example, the actuator control module 184 may include a timer that measures a duration of a period for which material is injected into the mold cavity 162, and the actuator control module 184 may determine that the predetermined criteria is satisfied when injection duration is greater than a predetermined period. If the predetermined criteria is satisfied, the method continues at step 118. Otherwise, the method returns to step 112.

Figure 15B:
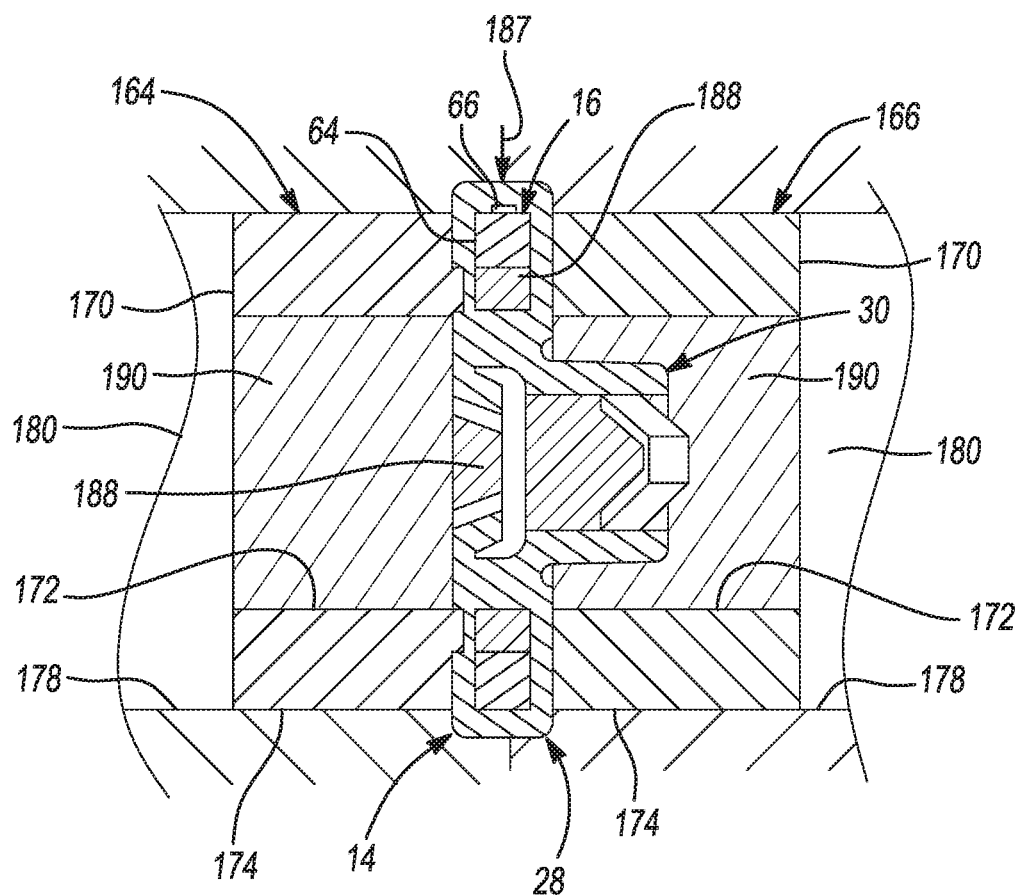

At step 118, the actuator control module 184 controls the ring pin actuators 180 to retract the first and second ring pins 164 and 166 as shown in FIGS. 15A and 15B, and thereby allow material to flow between the transponder 16 and the ring pins 164, 166. More specifically, when the first and second ring pins 164 and 166 are retracted (i.e., moved rearward in the axial direction 156), material is allowed to flow between the front axial end surfaces 168 of the ring pins 164, 166 and the side surfaces 72 of the transponder 16. When the first and second ring pins 164 and 166 are fully retracted, the injected material forms the front and back axial end surfaces 32 and 34 of the female part 14. In addition, when the first and second ring pins 164 and 166 are fully retracted, the circular groove 40 is formed in the front axial end surface 32 of the base 28 of the female part 14 due to the presence of the ledge 176 on the first ring pin 164.

The ability to move the first and second ring pins 164 and 166 in the axial direction 156 enables using the ring pins 164, 166 to hold the transponder 16 at the desired location and orientation until the base 28 is partially formed around the transponder 16. Thus, when the first and second ring pins 164 and 166 are retracted, the transponder 16 continues to be held in place by the partially formed base 28. In addition, the ability to move the first and second ring pins 164 and 166 in the axial direction 156 enables retracting the ring pins 164, 166 to form the rest of the base 28 without opening the mold 150.

At step 120, the injector 186 stops injecting material into the mold cavity 162 and allows the injected material (i.e., the completed female part 14) to cool and solidify. At step 122, the mold 150 is opened and the female part 14 of the RFID tag 110 is ejected from the mold 150. At step 124, the method ends.

In the above method, the actuator control module 184 determines whether the predetermined criteria is satisfied and, if so, the actuator control module 184 controls the ring pin actuators 180 to retract the first and second ring pins 164 and 166. However, in various implementations, the determination of whether the predetermined criteria is satisfied and/or the retraction of the first and second ring pins 164 and 166 may be performed by a person, at least in part. For example, the injector position from the injector position sensor 192 may be displayed using an electronic display, and a person viewing the display may determine that the predetermined criteria is satisfied when the injector position is greater than the predetermined position. In another example, when the predetermined criteria is satisfied, a person may press a button, lever, or touchscreen to control the ring pin actuators 180 to retract the first and second ring pins 164 and 166. In these examples, the button, lever, or touchscreen may generate the actuator control signal 182 in response to being pressed. In addition, the actuator control module 184 may be omitted.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for making a female part of a radio frequency identification (RFID) tag that is configured to be secured to an ear of an animal by joining a male part of the RFID tag and the female part of the RFID tag to one another through the ear of the animal, the method comprising:
   holding a transponder within a cavity of a mold using a fixture, wherein the transponder includes an antenna and an integrated circuit (IC) chip, and wherein the fixture includes a pair of ring pins;
   closing the mold;
   injecting material into the mold cavity and directly around the antenna and the IC chip to form a housing of the female part of the RFID tag;
   opening the mold; and
   ejecting the female part from the mold.

2. The method of claim 1 further comprising:
   positioning the ring pins in the mold cavity; and
   closing the mold to hold the transponder between the ring pins.

3. The method of claim 2 further comprising placing the transponder on a ledge of one of the ring pins before closing the mold.

4. The method of claim 2 further comprising moving the ring pins away from one another at the same time to allow the material to flow between the transponder and the ring pins.

5. The method of claim 4 further comprising:
   measuring a position of an injector that injects the material into the mold cavity; and
   determining when to move the ring pins away from one another based on the injector position.

6. The method of claim 4 further comprising determining when to move the ring pins away from one another based on a duration of a period for which the material is injected into the mold cavity.

7. The method of claim 4 further comprising determining when to move the ring pins away from one another based on a pressure within the mold cavity.

8. The method of claim 1 wherein the step of injecting material into the mold cavity includes injecting material around a core pin positioned within the mold cavity radially inward of the antenna to form a receptacle in the female part that holds a portion of the male part.

9. The method of claim 1 wherein the step of injecting material into the mold cavity includes injecting material into the mold cavity to form jaws of the female part of the RFID tag configured to retain a head of the male part of the RFID tag within a male part receptacle of the female part.

10. A method for making a radio frequency identification (RFID) tag, the method comprising:
    positioning a pair of ring pins in a cavity of a mold;
    placing a transponder on a ledge of one of the ring pins, wherein:
        the transponder includes an antenna and an integrated circuit (IC) chip; and
        an inner radial surface of the antenna contacts the ledge of the one ring pin when the transponder is placed on the ledge;
    closing the mold to hold the transponder between the ring pins;
    injecting material into the mold cavity and around the transponder to form a part of the RFID tag;
    opening the mold;
    ejecting the part from the mold; and
    attaching the IC chip to an outer radial surface of the antenna before placing the transponder on the ledge.

11. The method of claim 10 wherein the step of positioning the ring pins in the mold cavity includes moving the ring pins within the mold.

12. The method of claim 10 wherein the step of injecting material into the mold cavity includes injecting material directly around the inner and outer radial surfaces of the antenna and perimeter edges and an outer radial surface of the IC chip.

13. A system for making a female part of a radio frequency identification (RFID) tag that is configured to be secured to an ear of an animal by joining a male part of the RFID tag and the female part of the RFID tag to one another through the ear of the animal, the system comprising:
a mold having a cavity;
a fixture configured to hold a transponder within the mold cavity, wherein the transponder includes an antenna and an integrated circuit (IC) chip, wherein the fixture includes a pair of ring pins; and
an injector configured to inject material into the mold cavity, wherein the mold and the fixture are configured such that the injected material is injected directly around the antenna and the IC chip to form a housing of the female part of the RFID tag.

14. The system of claim 13 further comprising:
an actuator configured to move the ring pins toward and away from one another within the mold cavity; and
an actuator control module configured to control the actuator to move the ring pins toward one another to hold the transponder between the ring pins.

15. The system of claim 14 wherein at least one of the ring pins has a ledge for holding the transponder.

16. The system of claim 15 wherein an inner radial surface of the antenna contacts the ledge of the one ring pin when the transponder is placed on the ledge.

17. The system of claim 16 wherein the IC chip is attached to an outer radial surface of the antenna.

18. The system of claim 17 wherein the injector is configured to inject material into the mold cavity directly around the inner and outer radial surfaces of the antenna and perimeter edges and an outer radial surface of the IC chip.

19. The system of claim 14 wherein the actuator control module is configured to control the actuator to move the ring pins away from one another at the same time to allow the material to flow between the transponder and the ring pins.

20. The system of claim 19 further comprising a position sensor configured to measure a position of the injector, wherein the actuator control module is configured to determine when to control the actuator to move the ring pins away from one another based on the injector position.

21. The system of claim 19 wherein the actuator control module is configured to determine when to control the actuator to move the ring pins away from one another based on a duration of a period for which the material is injected into the mold cavity.

22. The system of claim 19 wherein the actuator control module is configured to determine when to control the actuator to move the ring pins away from one another based on a pressure within the mold cavity.

23. A method for making a female part of a radio frequency identification (RFID) tag that is configured to be secured to an ear of an animal by joining a male part of the RFID tag and the female part of the RFID tag to one another through the ear of the animal, the method comprising:
holding a transponder within a cavity of a mold using a fixture, wherein the transponder includes an antenna and an integrated circuit (IC) chip;
closing the mold;
injecting material into the mold cavity and directly around the antenna and the IC chip to form a housing of the female part of the RFID tag;
opening the mold; and
ejecting the female part from the mold, wherein the step of holding the transponder within the mold cavity includes contacting an inner radial surface of the antenna with the fixture.

24. A method for making a female part of a radio frequency identification (RFID) tag that is configured to be secured to an ear of an animal by joining a male part of the RFID tag and the female part of the RFID tag to one another through the ear of the animal, the method comprising:
holding a transponder within a cavity of a mold using a fixture, wherein the transponder includes an antenna and an integrated circuit (IC) chip;
closing the mold;
injecting material into the mold cavity and directly around the antenna and the IC chip to form a housing of the female part of the RFID tag;
opening the mold; and
ejecting the female part from the mold, wherein the step of injecting material into the mold cavity includes injecting material into the mold cavity and directly around opposing side surfaces of the antenna that extend between inner and outer radial surfaces of the antenna.

25. A method for making a female part of a radio frequency identification (RFID) tag that is configured to be secured to an ear of an animal by joining a male part of the RFID tag and the female part of the RFID tag to one another through the ear of the animal, the method comprising:
holding a transponder within a cavity of a mold using a fixture, wherein the transponder includes an antenna and an integrated circuit (IC) chip;
closing the mold;
injecting material into the mold cavity and directly around the antenna and the IC chip to form a housing of the female part of the RFID tag;
opening the mold; and
ejecting the female part from the mold, wherein the step of injecting material into the mold cavity includes injecting material into the mold cavity and directly around the antenna and the IC chip to form the entire housing of the female part of the RFID tag.

26. A system for making a female part of a radio frequency identification (RFID) tag that is configured to be secured to an ear of an animal by joining a male part of the RFID tag and the female part of the RFID tag to one another through the ear of the animal, the system comprising:
a mold having a cavity;
a fixture configured to hold a transponder within the mold cavity, wherein the transponder includes an antenna and an integrated circuit (IC) chip, and wherein the fixture is configured to hold the transponder within the mold cavity by contacting an inner radial surface of the antenna; and
an injector configured to inject material into the mold cavity, wherein the mold and the fixture are configured such that the injected material is injected directly around the antenna and the IC chip to form a housing of the female part of the RFID tag.

* * * * *